United States Patent
Nishiji

(10) Patent No.: US 6,827,662 B2
(45) Date of Patent: Dec. 7, 2004

(54) COMBINED DIFFERENTIAL GEAR DEVICE

(75) Inventor: Makoto Nishiji, Saitama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/265,995

(22) Filed: Oct. 7, 2002

(65) Prior Publication Data

US 2003/0078131 A1 Apr. 24, 2003

(30) Foreign Application Priority Data

Oct. 23, 2001 (JP) .................................... 2001-324406

(51) Int. Cl.$^7$ .............................................. F16H 48/06
(52) U.S. Cl. ...................... 475/221; 475/220; 475/204; 475/206; 475/198; 74/650; 74/655; 180/248
(58) Field of Search ................................ 475/220, 221, 475/198, 204, 206; 74/650, 655; 180/248

(56) References Cited

U.S. PATENT DOCUMENTS

| | | | |
|---|---|---|---|
| RE23,691 E | | 7/1953 | Randol |
| 4,207,780 A | | 6/1980 | Saxton |
| 4,428,452 A | * | 1/1984 | Muraoka et al. ............ 180/249 |
| 4,589,304 A | * | 5/1986 | Ashikawa et al. .......... 475/225 |
| 4,625,585 A | | 12/1986 | Dissett |
| 4,779,699 A | * | 10/1988 | Hatano ....................... 180/248 |
| 4,817,753 A | | 4/1989 | Hiketa |
| 5,176,589 A | * | 1/1993 | Borgudd ..................... 475/221 |
| 5,423,726 A | * | 6/1995 | Kota et al. .................. 475/206 |
| 5,522,776 A | * | 6/1996 | Alvey .......................... 477/35 |
| 5,533,943 A | | 7/1996 | Ichioka et al. |
| 5,547,430 A | | 8/1996 | Gasch |
| 5,554,080 A | | 9/1996 | Dangel |
| 5,695,426 A | * | 12/1997 | Lippitsch ..................... 475/204 |
| 5,902,206 A | * | 5/1999 | Oda et al. ................... 475/221 |
| 5,904,634 A | * | 5/1999 | Teraoka ....................... 475/231 |
| 6,001,043 A | * | 12/1999 | Yun ............................. 475/221 |
| 6,066,064 A | * | 5/2000 | Nishiji ........................ 475/248 |
| 6,074,321 A | * | 6/2000 | Maeda et al. ............... 475/221 |
| 6,076,623 A | * | 6/2000 | Teraoka et al. ............. 180/233 |
| 6,117,038 A | | 9/2000 | Nishiji et al. ............... 475/221 |
| 6,120,407 A | * | 9/2000 | Mimura ....................... 475/225 |
| 6,378,638 B1 | * | 4/2002 | Mizon et al. ............... 180/65.6 |
| 6,620,071 B1 | * | 9/2003 | Cook et al. .................. 475/221 |
| 2003/0045391 A1 | * | 3/2003 | Nishiji et al. ............... 475/221 |

FOREIGN PATENT DOCUMENTS

| | | | | |
|---|---|---|---|---|
| DE | 3600385 | | 7/1986 | |
| EP | 0043806 | | 1/1982 | |
| EP | 0857892 | | 8/1998 | |
| FR | 002700302 | | 7/1994 | |
| GB | 952861 | | 3/1964 | |
| JP | 59057032 | | 4/1984 | |
| JP | 61166729 A | * | 7/1986 | ......... B60K/17/348 |
| JP | 1-172025 | | 7/1989 | |
| JP | 03189242 A | * | 8/1991 | ......... B60K/17/348 |
| JP | 06137384 A | * | 5/1994 | ............. F16H/1/40 |
| JP | 11-257463 | | 9/1999 | |

* cited by examiner

*Primary Examiner*—Roger Pang
*Assistant Examiner*—David D. Le
(74) *Attorney, Agent, or Firm*—Thomas B. Ryan, Esq.; Harter, Secrest & Emery LLP

(57) ABSTRACT

A planetary gear mechanism 3 is provided at one end portion of a housing 2 in a direction of the rotation axis L. The mechanism 3 includes a planetary gear 31 disposed at the housing such that the planetary gear is rotatable about its own axis and revolvable about the rotation axis together with the housing, and an inner gear 33 and a sun gear 34 which are in mesh with the planetary gear. A differential gear mechanism 4 is provided at the other end portion of the housing. The mechanism 4 includes a casing 41 non-rotatably connected to the sun gear, a pair of pinion gears 43 disposed within the casing such that the pinion gears are rotatable about their axes and revolvable about the rotation axis together with the casing, and a pair of side gears 44, which are in mesh with the pinion gears.

9 Claims, 4 Drawing Sheets

COMBINED DIFFERENTIAL GEAR DEVICE

TECHNICAL FIELD OF THE INVENTION

This invention relates to a combined differential gear device in which a planetary gear mechanism and a differential gear mechanism are built in a housing.

BACKGROUND OF THE INVENTION

In general, a combined differential gear device comprises a housing which is driven for rotation about a rotation axis, and a planetary gear mechanism and a differential gear mechanism which are disposed within the housing. A receiving hole extending in parallel with the rotation axis is formed in the housing. A planetary gear is rotatably (about its own axis) received in this receiving hole. An inner gear and a sun gear are rotatably disposed within the housing with their axes aligned with the rotation axis. The inner gear and the sun gear are in meshing engagement with the planetary gear. The planetary gear mechanism is constituted by the inner gear, the planetary gear and the sun gear.

On the other hand, the differential gear mechanism is arranged within the sun gear. That is, the sun gear has a hollow interior and also serves as a casing of the differential gear mechanism. A pinion gear whose axis is orthogonal to the rotation axis, and a pair of side gears whose axes are aligned with the rotation axis, are disposed within the sun gear such that they are rotatable about their axes. The pinion gear is in meshing engagement with the pair of side gears. The differential gear mechanism is constituted by the pinion gear and the pair of side gears.

In the conventional combined differential gear device, since the planetary gear device and the differential gear device are arranged, side by side, in the radial direction of the housing, the entire device is enlarged in outside diameter. That is, in the conventional combined differential gear device, since the differential gear mechanism is disposed within the sun gear, the sun gear is enlarged in outside diameter. Then, the differential gear mechanism containing the sun gear is enlarged in outside diameter. As a result, the housing is inevitably enlarged in outside diameter. This makes the entire combined differential gear device large in size.

SUMMARY OF THE INVENTION

The present invention has been made in order to solve the above problems and its features reside in a combined differential gear device in which a planetary gear mechanism and a differential gear mechanism are built in a housing which is driven for rotation about a rotation axis, the planetary gear mechanism including at least one planetary gear rotatably received in at least one receiving hole which is formed in the housing in parallel with the rotation axis, and an inner gear and a sun gear which are rotatably arranged on the housing with axes thereof aligned with the rotation axis and which are in meshing engagement with the planetary gear, the differential gear mechanism including a casing rotatably disposed within the housing with an axis thereof aligned with the rotation axis and connected to one of the inner gear and the sun gear in such a manner as to rotate in unison therewith, at least one pinion gear rotatably arranged within the casing with an axis thereof orthogonal to the rotation axis, and a pair of side gears arranged within the casing with axes thereof aligned with the rotation axis and being in meshing engagement with the pinion gear, and the planetary gear mechanism and the differential gear mechanism being arranged in adjacent relation in a direction of the rotation axis.

In the above-mentioned construction, it is preferred that the casing includes a connection portion non-rotatably connected to one of the inner gear and the sun gear and a support portion connected to one end portion of the connection portion in a direction of the rotation axis and having a receiving space formed therein, the support portion is disposed away, in a direction of the rotation axis, from one of the inner gear and the sun gear to which the connection portion is connected, and the pinion and the pair of side gears constituting the differential gear mechanism are received in the receiving space.

It is also preferred that an output gear having an outer gear portion connected to the other of the inner gear and the sun gear in such a manner as to rotate in unison therewith is provided at an outer peripheral portion of the housing, and the outer gear portion is arranged at an intermediate portion of the outer peripheral surface of the housing in a direction of the rotation axis.

DETAILED DESCRIPTION OF THE INVENTION

Embodiments of the present invention will now be described with reference to FIGS. 1 through 4.

Figure 1:
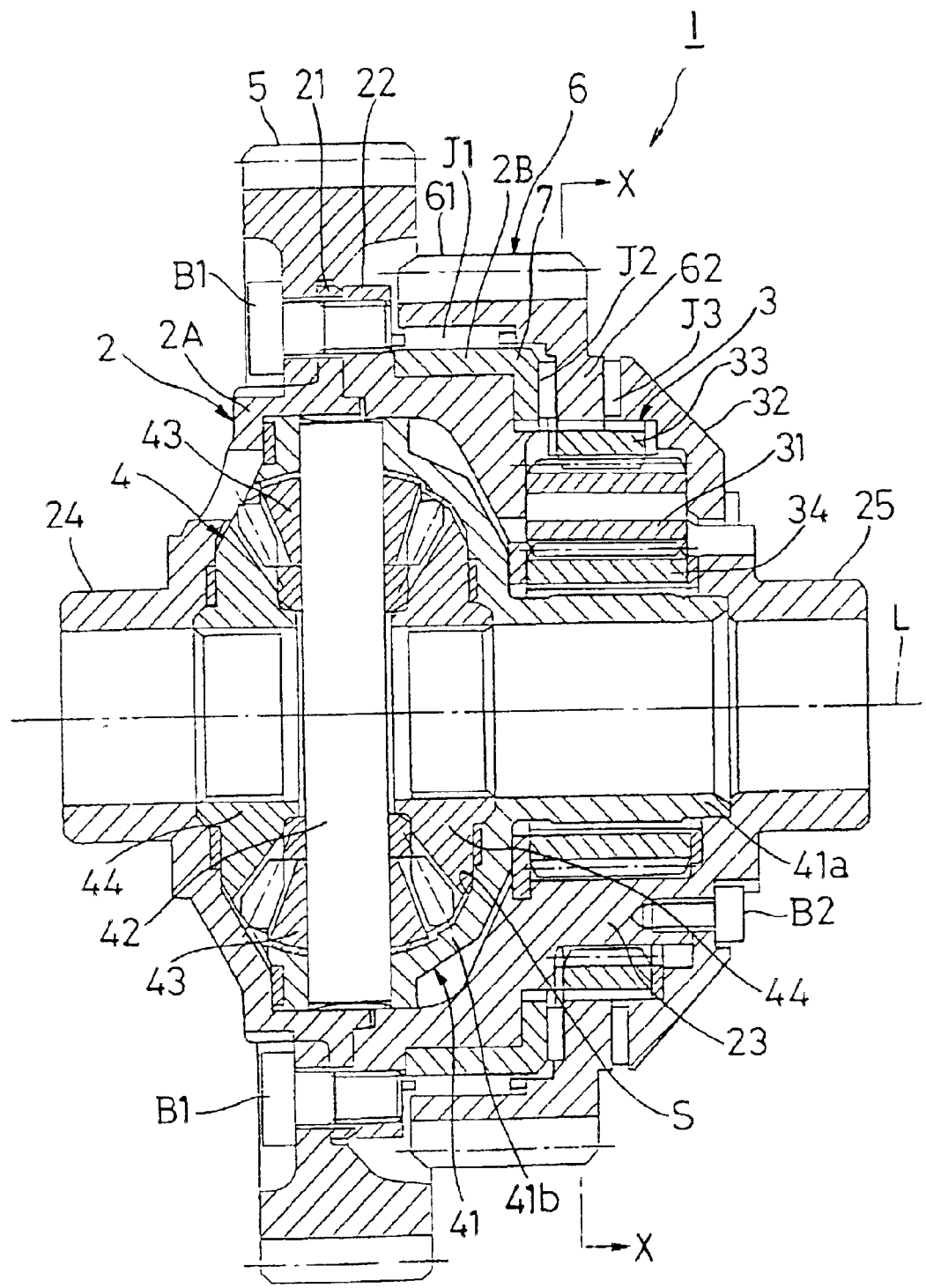
FIG. 1 is an illustration showing one embodiment of the present invention and is a sectional view taken on line X—X of FIG. 2.
Figure 2:
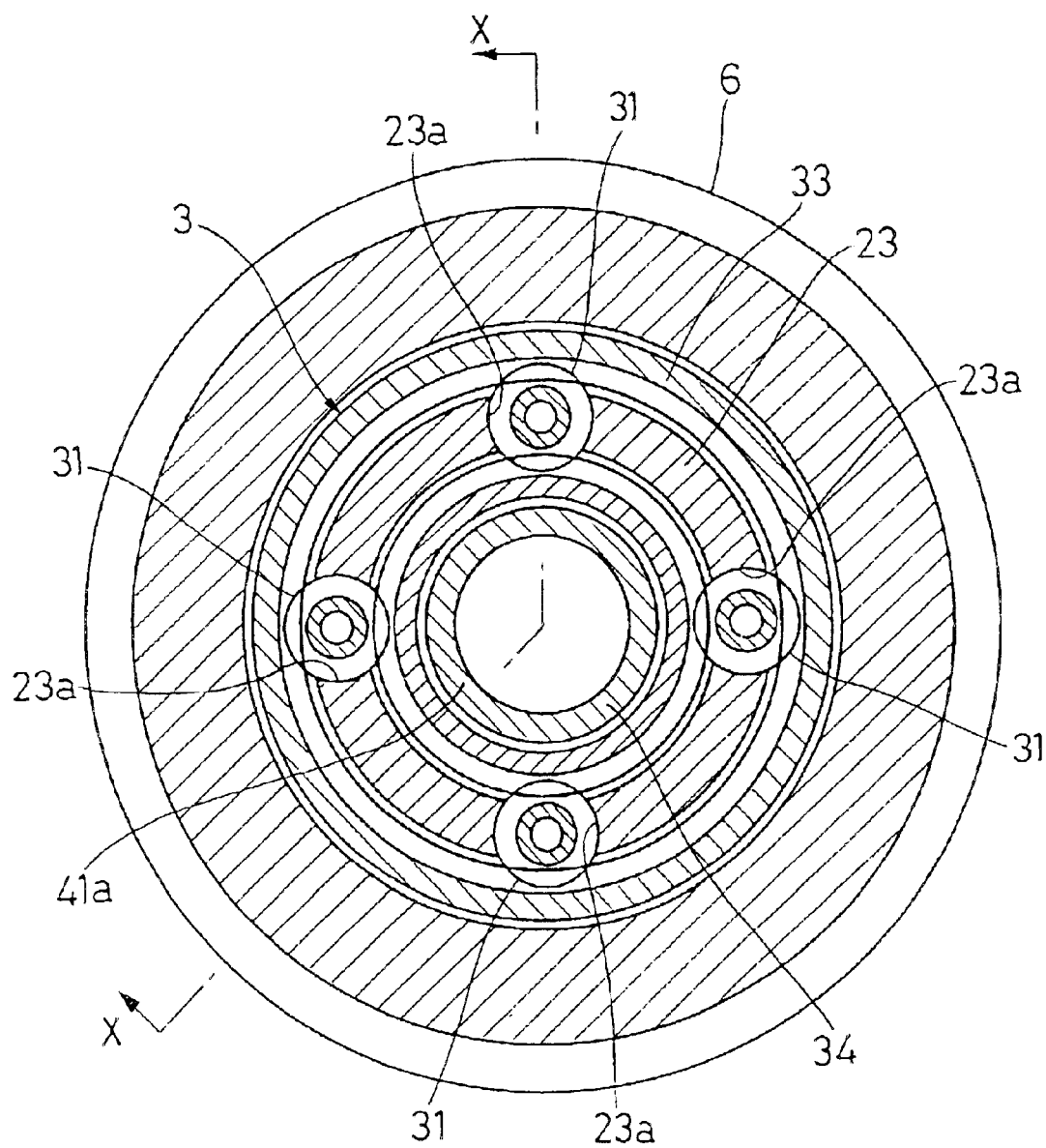
FIG. 2 is a sectional view taken on line X—X of FIG. 1.
Figure 3:
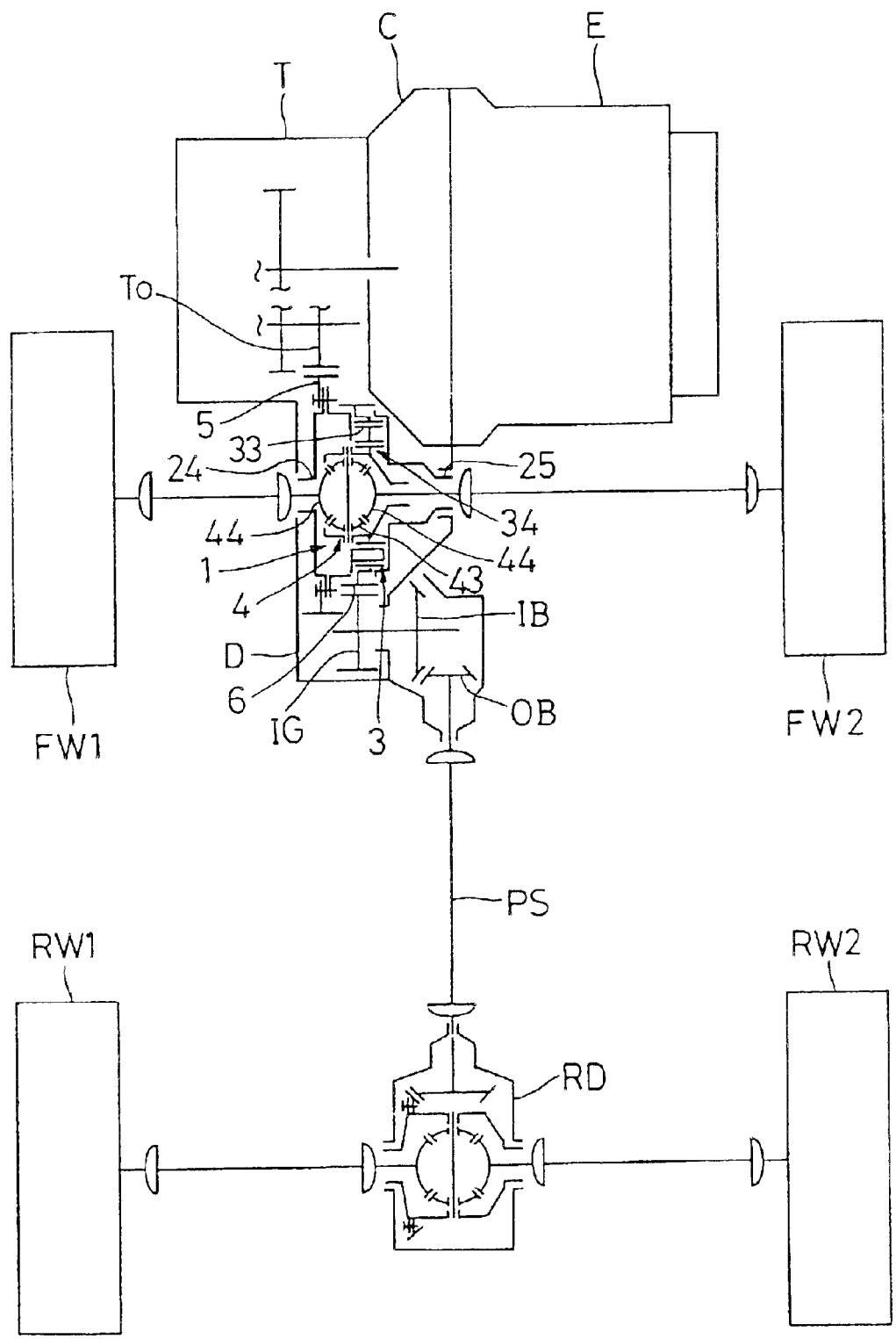
FIG. 3 is a schematic view of the construction showing a rotation transmission system of a vehicle in which the combined differential gear device of FIGS. 1 and 2 is used.

FIGS. 1 and 2 show one embodiment of the present invention. A combined differential gear device 1 according to this embodiment includes a housing 2 which is driven for rotation about a rotation axis L. Within the housing 2, a planetary gear mechanism 3 and a differential gear mechanism 4 are disposed. The planetary gear mechanism 3 and the differential gear mechanism 4 are arranged, side by side, in a direction of the rotation axis L.

The housing 2 is bisected in a direction of the rotation axis L and is constituted by two half bodies 2A, 2B. The two half bodies 2A, 2B have flange portions 21, 22 which are formed on the outer peripheries of mutually adjacent end portions thereof, respectively. Those flange portions 21, 22 are in abutment relation. An input gear 5, an axis of which is aligned with the rotation axis L, is abutted with an end face of the flange portion 21 on the opposite side of the flange portion 22. By tightening a bolt B1 which is pierced through the input gear 5 and the flange portion 21 and is threadingly engaged with the flange portion 22, the half bodies 2A, 2B are integrated and the input gear 5 is fixed to the housing 2. The input gear 5 is driven for rotation by an engine (not shown). By this, the housing 2 is driven for rotation about the rotation axis L.

The planetary gear mechanism 3 will be described next. An annular retainer portion 23 is formed on that end face of the half body 2B which is located on the opposite side of the half body 2A. This retainer portion 23 is formed such that its axis is aligned with the rotation axis L. The retainer portion 23 has a plurality (four in this embodiment) of receiving holes 23a. Those receiving holes 23 extend from the distal end face (right end face of FIG. 1) of the retainer portion 23 towards the basal end side in parallel with the rotation axis L. Those receiving holes 23a are formed in the retainer portion 23 at equal intervals in the circumferential direction of the retainer portion 23. The receiving holes 23a are arranged such that their axes are located at the center of the outer and inner peripheral surfaces of the retainer portion 23. Moreover, the inside diameter of each receiving hole 23a is dimensioned to be larger than the radial thickness (=(outside diameter of the retainer portion 23 - inside diameter of the retainer portion 23)/2). As a result, the inner and outer side portions of the receiving holes 23a are opened from the inner and outer peripheral surfaces of the retainer portion 23, respectively.

The half body 2A has a bearing portion 24 which is formed on a central portion of its end face orienting in the opposite side of the half body 2B. Another bearing portion 25 is integrally formed on the retainer portion 23. Those bearing portions 24, 25 are disposed such that their axes are aligned with the rotation axis L. The bearing portions 24, 25 are rotatably supported on a differential gear device case (not shown) through bearings (not shown), respectively.

The planetary gear 31 is rotatably (about its own axis) received in the receiving hole 23a. The planetary gear 31 is prevented from escaping from the receiving hole 23 by a cover 32 which is fixed to a distal end face of the retainer portion 23 by a bolt B2. Within the housing 2, an inner (internal) gear 33 and a sun gear 34, axes of which are aligned with the rotation axis L, are arranged at locations outside and inside of the planetary gears 31, respectively. The inner gear is in meshing engagement with the planetary gears 31 at the outside opening portion of the receiving hole 23a. On the other hand, the sun gear 34 is in meshing engagement with the planetary gears 31 at inside opening portion of the receiving portion 23a. Accordingly, when the housing 2 is driven for rotation, the rotary torque transmitted to the housing 2 is transmitted to the inner gear 33 and the sun gear 34 through the planetary gears 31, whereby the inner gear 33 and the sun gear 34 are driven for rotation about the rotation axis L. The inner gear 33 and the sun gear 34 are rotated at the same speed when the planetary gears 31 are not rotated about their own axes. When the planetary gears 31 are rotated about their own axes, the inner gear 33 and the sun gear 34 are differentially rotated in accordance with the rotating speed of the planetary gears 31.

The housing 2 is provided on its outer peripheral portion with an output gear 6. The output gear 6 comprises an outer gear portion 61 and an annular protrusion 62 which is formed on an inner peripheral surface of the right end portion, in FIG. 1, of the outer gear portion 61. The outer gear portion 61 is arranged at an intermediate portion of the outer peripheral surface of the housing 2 in the direction of the rotation axis L. The outer gear portion 61 is rotatably supported on the outer peripheral surface of the housing 2 through a bush 7 and a bearing J1. The annular protrusion 62 is sandwichingly held between the half body 2B and the cover 32 through the bush 7 and a thrust bearings J2, J3. By this, the output gear 6 is positionally fixed in the direction of the rotation axis L. The annular protrusion 62 is non-rotatably connected to the outer periphery of the inner gear 33 by means of spline engagement. Accordingly, the output gear 6 is rotated in unison with the inner gear 33, and rotary torque is transmitted to the output gear 6 from the inner gear 33. Hence, in case this combined differential gear device 1 is used as a center and front differential gear device, the rotary torque transmitted to the inner gear 33 is, as later described, transmitted to a rear differential gear device (not shown) through the output gear 6. In case the combined differential gear device 1 is used as a center and rear differential gear device, the rotary torque transmitted to the inner gear 33 is transmitted from the output gear 6 to a front differential gear device (not shown). On the other hand, the rotary torque transmitted to the sun gear 34 is transmitted to a casing 4 1 of the differential gear mechanism 4, as described hereinafter.

The casing 41 of the differential gear mechanism 4 is rotatably arranged within the housing 2 with its axis aligned with the rotation axis L. The casing 41 comprises a circular cylindrical connection portion 41a and a support portion 41b integrally connected to the connection portion 41a. The connection portion 41a is non-rotatably connected to the inner peripheral surface of the sun gear 34 by mean of spline engagement. Accordingly, the casing 41 is rotated in unison with the sun gear 34. On the other hand, the support portion 41b is located on the left side, in FIG. 1, of the sun gear 34 and received in the half bodies 2A, 2B at their abutment portions. As a result, the support portion 41b is located adjacent to the sun gear 34 in a direction of the rotation axis L, and the differential gear mechanism 4 is arranged in side by side relation with the planetary gear mechanism 3 in the direction of the rotation axis L.

A receiving space S is defined by an interior of the support portion 41b and an inner surface of the half body 2A facing the interior of the support portion 41b. A support shaft 42, a pair of pinion gears 43, 43 and a pair of side gears 44, 44 are arranged within the receiving space S. That support shaft 42 is supported at opposite end portions thereof by the support portion 41b with its axis orthogonal to the rotation axis L. The pinion gears 43, 43 are rotatably engaged with opposite end portions of the support shaft 42 within the receiving space S. Accordingly, the pinion gear 43 is rotatable about the support shaft 42. In addition, when the casing 41 is rotated, the pinion gear 43 is revolved about the rotation axis L. On the other hand, the pair of side gears 44, 44 are rotatably arranged at the opposite end portions of the receiving space S in the direction of the rotation axis L with their axes aligned with the rotation axis L. The pair of side gears 44, 44 are in meshing engagement with the pinion gears 43. Accordingly, when the pinion gears 43 are revolved, the pair of side gears 44, 44 are rotated. The pair of side gears 44, 44 are rotated at the same speed when the pinion gears 43 are not rotated about their own axes. When the pinion gears 43 are rotated about their own axes, the side gears 44, 44 are differentially rotated in accordance therewith. The pair of side gears 44, 44 are connected, for example, to the left and right front wheels or left and right rear wheels (none of them are shown), respectively.

In the combined differential gear device 1 thus constructed, the planetary gear mechanism 3 and the differential gear mechanism 4 are arranged in side by side relation in the direction of the rotation axis L without being arranged in side by side relation in the radial direction of the housing 2. Accordingly, the outside diameter of the planetary gear device 3, especially the outside diameter of the inner gear 33, can be reduced and therefore, the outside diameter of the housing 2 containing the inner gear 33 can be reduced. Thus, the outside diameter of the entire device 1 can be reduced.

Moreover, in the combined differential gear device 1 according to this embodiment, the outer gear portion 61 of the output gear 6 serving as the output portion of the inner gear 33 is arranged at an intermediate portion in the direction of the rotation axis L of the housing 2. Accordingly, in case the device 1 is used as a center and front differential gear device, the rear differential gear device can be arranged at a central portion of the vehicle. Moreover, the combined differential gear device 1 can be arranged proximal to the central portion in a left and right direction of the vehicle without any difficulty.

In the housing 2 of the combined differential gear device I, the bearing portions 24, 25 are rotatably supported by the differential gear device case D. The rotary torque of the engine E is transmitted from an output gear To of the transmission T to the housing 2 through the input gear 5. The output gear 6 connected to the inner gear 33 of the planetary gear mechanism 3 is in meshing engagement with an idle gear IG. An input bevel gear IB is connected to the idle gear IG such that they are rotated in unison. The input bevel gear IB is in meshing engagement with an output bevel gear OB. The output bevel gear OB is connected to a rear differential gear device RD through a propeller shaft PS. The rotary torque transmitted to the rear differential gear device RD is transmitted to the left and right rear wheels RW1, RW2. On the other hand, the pair of side gear 44, 44 of the differential gear mechanism 4 are connected to the left and right front wheels FW1, FW2, respectively.

The output bevel gear OB, the propeller shaft PS and the rear differential gear device RD are arranged at a central portion in a left and right direction of the vehicle. Presuming that the combined differential gear device 1 does not have the output gear 6, the input bevel gear IB would be required to be provided at one end portion of the inner gear 33 which projects from the housing 2 towards the right front wheel FW2. However, if an arrangement should be made in this way, the output bevel gear OB, which is in meshing engagement with the input bevel gear IB, would be offset from the central portion in the left and right direction of the vehicle towards the right front wheel 2 side. In correspondence therewith, the propeller shaft PS and the rear differential gear device RD would be required to be offset in the same direction. Accordingly, in case the propeller shaft PS and the rear differential gear device RD are arranged at the central portion in the left and right direction of the vehicle, the combined differential gear device 1 would be required to be offset from the intermediate portion in the left and right direction of the vehicle towards the left and right direction (left direction, when viewed from a rear side of the vehicle, in this embodiment).

In this respect, since the combined differential gear device 1 is constructed such that the output gear 6 is connected to the inner gear 33 and this output gear 6 is arranged at an intermediate portion of the housing 2 in the direction of the rotation axis L, the output bevel gear OB can be arranged at the central portion in the left and right direction of the vehicle without any difficulty even in case the combined differential gear device 1 is arranged proximal to the central portion in the left and right direction of the vehicle. Moreover, the propeller shaft PS and the rear differential gear device RD can also be arranged at the central portion of the vehicle.

Figure 4:
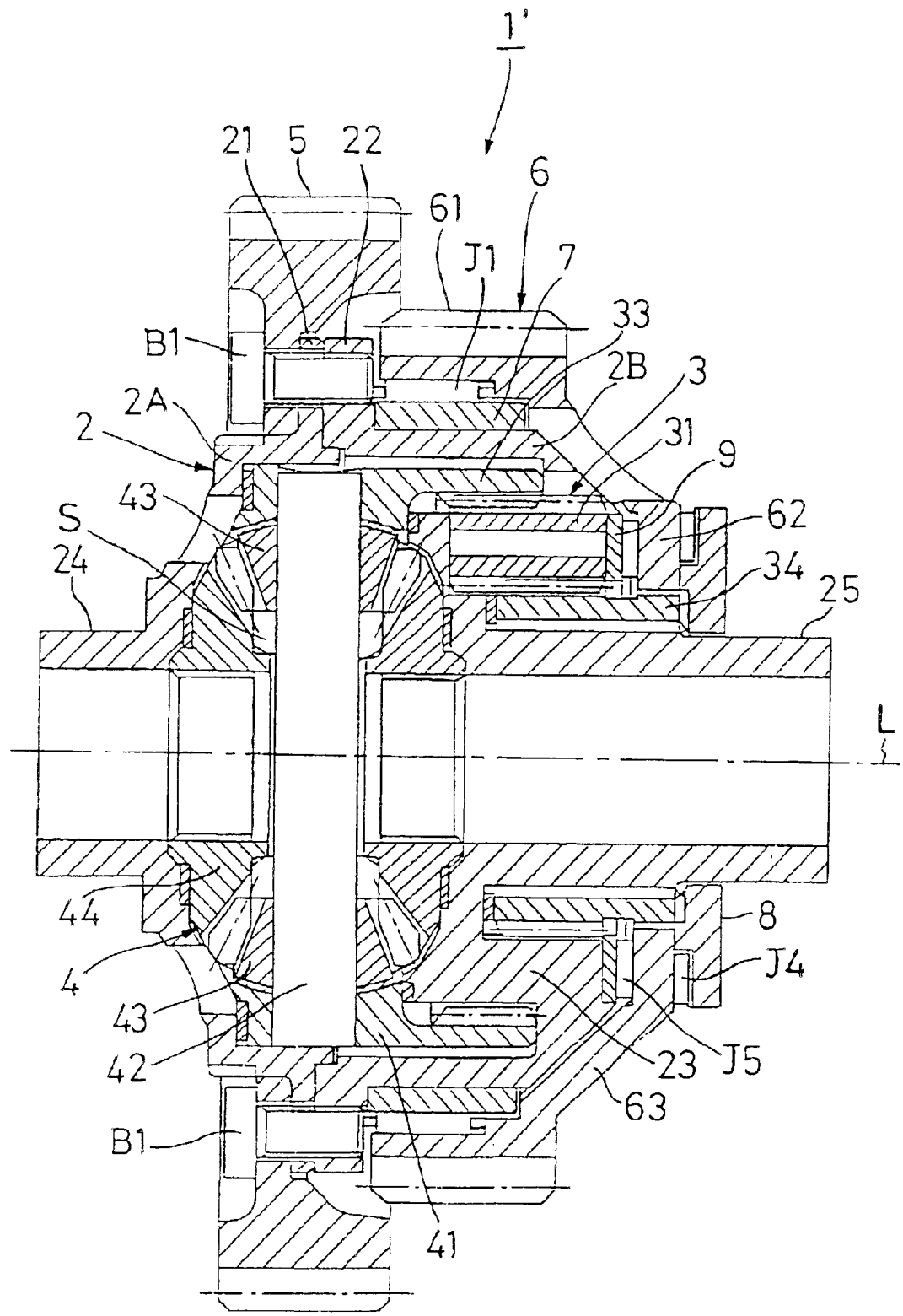
FIG. 4 is a sectional view, like FIG. 1, showing another embodiment of the present invention.

FIG. 4 shows another embodiment of the present invention. In a combined differential gear device 1' according to this embodiment, the annular protrusion 62 of the output gear 6 is non-rotatably connected to the sun gear 34, instead of being connected to the inner gear 33. Moreover, the annular protrusion 62 is in spline engagement with the outer peripheral surface of the right end portion, in FIG. 4, of the sun gear 34 and arranged away from the outer gear portion 61 in the direction of the rotation axis L. Therefore, a tapered connection portion 63 is disposed between the outer gear portion 61 and the annular protrusion 62 in such a manner as to be integral therewith. The annular protrusion 62 is sandwiching held between the retainer portion 23 and a female screw member 8 threadingly engaged with the half body 2B through thrust bearings J4, J5 and a washer 9. Owing to this arrangement, the output gear 6 is positionally fixed in the direction of the rotation axis L. Moreover, the annular protrusion 62 prevents the planetary gear 31 from escaping from the receiving hole 23a through the washer 9 and the thrust bearing J5.

Since the output gear 6 is connected to the sun gear 34, the casing 41 of the differential gear mechanism 4 is connected to the inner gear 33. Especially, in this embodiment, the casing 41 is integrally formed on the inner gear 33. Moreover, in this embodiment, the receiving space S for receiving therein the pinion gear 43 and the side gear 44 is defined, by the casing 41 and the central portions of the half bodies 2A, 2B which are located on opposite sides of the casing 41 in the direction of the rotation axis L. Since all of the remaining construction is same as the above-mentioned embodiment, like parts are denoted by like reference numerals and description thereof is omitted.

It should be noted that the present invention is not limited to the above embodiments and that many changes and modifications can be made in accordance with necessity.

For example, in the above embodiments, although the combined differential gear device 1 of the present invention is used as a center and front differential gear device, it may also be used as a center and rear differential gear device.

What is claimed is:

1. A combined differential gear device comprising:
   a housing composed of at least two half bodies, said housing being configured to be driven for rotation about a rotation axis (L) by a rotary torque of an engine (E);
   an internal gear disposed within said housing and rotatable relative thereto about the rotation axis (L);
   a sun gear disposed within said housing and rotatable relative to thereto about the rotation axis (L), a part of said sun gear being arranged radially inside of said internal gear along a common portion of the rotation axis (L);
   plural planetary gears disposed between said internal gear and said sun gear, and rotatable relative to said housing about the rotational axis (L), each of said plural planetary gears being configured to be revolved about its own revolving axis in parallel with the rotation axis (L) and being in respective meshing engagement with said internal gear and said sun gear;
   plural receiving holes formed in one of said two half bodies of said housing in parallel with the rotation axis (L) in which said plural planetary gears are respectively mounted for rotation by said receiving holes;
   a casing rotatably disposed in said housing and rotatable together with one of said internal gear and said sun gear about the rotation axis (L); and
   a differential gear mechanism disposed in said casing and arranged in side-by-side manner with said planetary gears in a direction of the rotation axis (L), said differential gear mechanism being configured to rotate with said one of said internal gear and said sun gear through said casing about the rotation axis (L).

2. A combined differential gear device according to claim 1, further comprising:
   an output gear connected to the other of said internal gear and said sun gear to rotate in unison therewith and provided at an outer peripheral portion of said housing; and an outer gear portion formed on and outside of said output gear integrally therewith, said outer gear portion being configured to be arranged at an intermediate portion of the outer peripheral portion of said housing in the direction of the rotation axis (L).

3. A combined differential gear device according to claim 1, wherein said internal gear is formed integrally with said casing.

4. Combined differential gear device according to claim 1, wherein the rotary torque of the engine (E) is divided through the planetary gear to said internal gear and said sun gear; and wherein the rotary torque transmitted to said one of said internal gear and said sun gear which is connected to said differential gear mechanism is further divided to two parts through said differential gear mechanism.

5. A combined differential gear device according to claim 1, said differential gear mechanism further comprising:

at least one pinion gear disposed within said casing and rotatable about its own rotational axis orthogonal to the rotation axis (L), said pinion gear being configured to be revolvable about the rotation axis (L) together with said casing; and a pair of side gears rotatably disposed within said casing about the rotation axis (L) and being meshing engagement with said at least one pinion gear.

6. A combined differential gear device according to claim 5, said differential gear mechanism further comprising:

a pinion shaft supported by said casing an axis of which is orthogonal to the rotation axis (L), said pinion shaft being configured to rotatably support said at least one pinion gear about the axis of said pinion shaft.

7. A combined differential gear device according to claim 5, wherein bevel gears are used as said pinion gear and said side gear.

8. A combined differential gear device according to claim 5, said casing further comprising:

a connection portion connected to said one of said internal gear and said sun gear and formed in parallel with the rotation axis (L);

a support portion connected one end of said connection portion in the direction of the rotation axis (L); and a receiving space (S) defined in said support portion, wherein said support portion is arranged away form said one of said internal gear and said sun gear in the direction of the rotation axis (L), and wherein said receiving space (S) receives said pinion gear and said pair of side gears constituting said differential gear mechansm therein.

9. A combined differential gear device according to claim 8, further comprising:

an output gear connected to the other of said internal gear and said sun gear to rotate in unison therewith and provided at an outer peripheral portion of said housing; and an outer gear portion formed on and outside of said output gear integrally therewith, said outer gear portion being configured to be arranged at an intermediate portion of the outer peripheral portion of said housing in the direction of the rotation axis (L).

* * * * *